Aug. 22, 1950      H. A. BETHE      2,519,734

DIRECTIONAL COUPLER

Filed April 24, 1945

*INVENTOR.*
HANS A. BETHE
BY
*William D. Hall,*
*ATTORNEY*

Patented Aug. 22, 1950

2,519,734

UNITED STATES PATENT OFFICE 2,519,734

DIRECTIONAL COUPLER

Hans A. Bethe, Santa Fe, N. Mex., assignor, by mesne assignments, to the United States of America as represented by the Secretary of War Application April 24, 1945, Serial No. 590,047

2 Claims. (Cl. 178—44)

The present invention relates to an electrical apparatus and particularly to an improved coupler for use in hollow wave guide systems.

Hollow wave guides (metallic ducts or pipes of selected cross-sectional shapes and dimensions) have become of practical importance as transmission means for wave energy at radio frequencies of about 3000 megacycles per second and higher, corresponding to wavelengths of 10 centimeters and shorter. Energy at such wavelengths or frequencies is hereinafter referred to as microwaves. Hollow wave guides may be used to conduct microwaves from a transmitter to an antenna in a communication system, or more generally, to guide electromagnetic waves from one point to another, or from one component to another, as from a source to a load in a microwave system.

The energy or power carried by hollow wave guides may be considered from the standpoint of interference between traveling electromagnetic waves. The usual condition existing within an excited wave guide is that a standing or stationary wave is present, resulting from interference between an incident wave which propagates or travels in the direction of energy transfer, and a reflected wave which propagates in the opposite direction. A reflected wave is produced by reflection from any element which does not absorb all of the energy incident upon it. Thus, in a system including a source and a load interconnected by a wave guide transmission line, the difference between the powers contained in the incident and reflected waves is the power absorbed by the terminating load. The various powers involved may be computed from measurements of maximum and minimum values of field intensity which are spaced at half-wavelength distances along a wave guide, and from the standing wave (power) ratio which is defined as the ratio of powers corresponding to the said maximum and minimum values.

In microwave apparatus including wave guides, it is necessary that wave energy be coupled to or from the wave guides for various purposes. This is generally accomplished by a probe which contacts the standing wave field within a wave guide, and the proportion of energy thus coupled to or from the wave guide is determined by the size and relative position of the probe.

Probe-type couplings, however, have several disadvantages. The proportion of energy coupled by a probe at some fixed location in a microwave system is dependent upon the extent to which the probe projects into the guide and upon the phase or relative position of the standing wave. Also, a probe introduces reflections which have a distorting effect upon the standing wave. A probe coupling therefore cannot be regarded as having fixed attenuation characteristics. A fixed probe is adapted to measure only the standing wave energy, corresponding to the field intensity at the fixed position along the standing wave. A probe measurement of maximum and minimum values of field intensity, and thereby of incident power, reflected power, load power and of standing wave ratio, requires that a traveling probe structure be utilized. A traveling probe method for such measurements is not only cumbersome, but requires appropriate mechanical gear of considerable precision.

In contrast to the several disadvantages inherent in probe coupling outlined above, the coupling structure here disclosed possesses not only the desirable characteristics of introducing very little reflection, of having a fixed attenuation, and of being insensitive to relative position, but also functions to select (separate) the traveling incident and reflected waves. The said coupling structure is therefore here termed a wave selector or directional coupler.

It is an object of the present invention to provide a directional coupler which functions to divert or couple a fixed proportion of the energy present in a traveling wave of a wave guide.

It is a further object of the present invention to provide a directional coupler which functions to selectively (separately) divert fixed proportions of the energies present in the incident and traveling waves of a wave guide.

Another object is to provide a directional coupler adapted for measurement of standing wave ratios and wave power.

Still another object is to provide a directional coupler of simple structure requiring no manipulation in its operation.

Other novel features and advantages of the invention will be apparent from the following description when read in connection with the drawing in which.

Similar characters of reference are used in all of the above figures to indicate corresponding parts.

Figure 1:
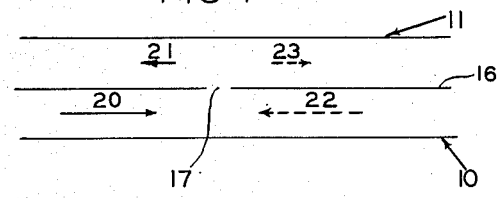
Fig. 1 is a schematic diagram representing a longitudinal section of a wave guide structure and illustrating the principles of the present invention.
Figure 2:
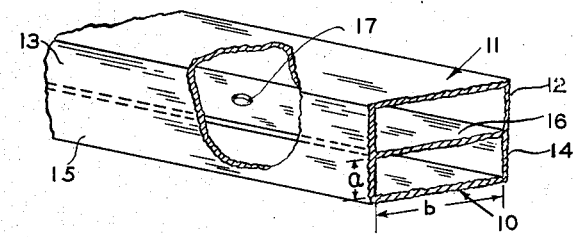
Fig. 2 is a cut-away isometric view of a central portion of the wave guide coupling structure shown in Fig. 3.

Referring now to explanatory Figs. 1 and 2 of the drawing, a directional coupler is illustrated in which the reference numeral 10 designates a length of hollow wave guide transmission line, here termed a main wave guide, which carries energy from a source to a load. The main wave guide 10 in the embodiment under discussion has a rectangular cross-section and operates in a dominant mode as will be hereinafter defined. A second length of auxiliary or branch wave guide 11, having the same cross-sectional size as the main wave guide 10, is joined to the said main wave guide in such fashion that there is a wall between them which is common to the two guides, the said wall being perpendicular to the electric fields existing in the guides during excitation, as will appear hereinafter. The width of the said common wall is here termed $b$ (the wider dimension of each wave guide cross-section) and the width of each wave guide wall 12, 13, 14 and 15 perpendicular to the common wall is termed $a$ (the narrower dimension). The main and branch wave guides in the illustrated embodiment are disposed in substantially parallel relationship, as shown.

The common wall 16 of the main and branch wave guides has an aperture or window 17 located at a point of maximum electric field intensity with respect to the side walls 12, 13, 14 and 15 of the structure. The aperture 17 functions to couple the main wave guide 10 to branch wave guide 11 in such manner that a "primary" wave (either incident or reflected) traveling in the main wave guide energizes or excites the branch wave guide, and, in a general case, causes propagation of two "secondary" waves. These secondary waves have unequal amplitudes or intensities and travel away from the aperture in opposite directions in the branch wave guide. The branch wave guide may be considered as having two sections extending in opposite directions from said aperture. The relative intensities of the secondary waves in the two sections are determined by the relationship between the width $b$ of the wave guides, and the free-space wavelength of the energy.

In a coupling structure of the present invention, operating in a dominant mode, having an aperture of circular form in the common wave guide wall, and having the dimension $b$ of the main and branch wave guides substantially equal to $0.707\lambda$ (where $\lambda$ is the free-space wavelength of the microwave energy carried by the wave guide system), a primary wave traveling in a given direction in the main wave guide excites but one secondary wave (as distinguished from the two secondary waves of the general case mentioned above), said secondary wave traveling in an opposite or backward direction (as referred to the primary wave direction) in the backwardly extending section of the branch wave guide.

Thus, referring to Fig. 1, if an incident wave in a main wave guide 10 is assumed to travel to the right as indicated by arrow 20, a secondary wave is excited in the left section of branch wave guide 11 as indicated by the arrow 21. Similarly, a reflected wave traveling toward the left in the main wave guide, as indicated by dotted arrow 22, produces a secondary wave traveling toward the right in the right section of the branch wave guide, as indicated by dotted arrow 23. A process of wave selection is thus accomplished, and each secondary wave is of smaller amplitude than its corresponding primary wave and bears a definite ratio thereto determined by the size of the coupling aperture 17. The ratio of the power diverted or coupled from a primary wave can be made as small as desired by suitable dimensioning of the coupling aperture.

In the dominant mode referred to previously, known in the art as the $TE_{0,1}$ mode, the instantaneous electromagnetic field configuration is such that the electric lines of force extend from the bottom to the top of a wave guide, perpendicularly to the wider guide walls. The intensity of the electric field varies sinusoidally along the $b$ dimension, having a maximum at the middle of the guide and being substantially zero at the edges. Along the $a$ dimension the intensity of the electric field is uniform, and along the axis of the guide it varies sinusoidally. The electric and magnetic fields are mutually perpendicular at all points, and the magnetic flux lines form closed loops which lies in planes parallel to the wider walls of the wave guide.

Other modes of propagation may be entertained with the invention here disclosed, care being taken to suitably dimension the directional coupler and to locate the coupling aperture at a position of maximum electric field intensity.

In a general case, excitation through an aperture or window takes place due to action of an electric field normal to the window, and to a magnetic field in the plane of the window. Each of these fields produce secondary waves of equal amplitudes which are propagated in the two directions of the branch guide. In the case of a traveling electromagnetic wave in the main wave guide, the secondary waves produced by the electric field in the respective directions are in phase difference with those produced by the magnetic field in the same directions. Because of the different phase relations for the waves excited electrically and magnetically, there is a substantial difference in intensity between the resultant secondary waves in the two directions in the branch wave guide. This condition may be measured by a factor here termed selectivity which is defined as the ratio of the intensity of a resultant secondary wave in a backward direction to the intensity of a resultant secondary wave in a forward direction, the said two resultant secondary waves being produced by a primary wave. Thus, the characteristic generally desired in a directional coupler is that of high selectivity.

In the structure here disclosed having parallel rectangular main and branch wave guides operating in the dominant $TE_{0,1}$ mode, the guides having a common wider wall of width substantially equal to $0.707\lambda$, and having a circular coupling aperture centrally located in the common wider wall, the component secondary waves traveling in the direction of the primary wave are equal but in phase opposition, thus combining destructively and canceling out in that direction. In the direction opposite to that of the primary wave, the component secondary waves are equal and combine constructively. Thus in a structure as above described, the interference of excitation by the electric and magnetic fields is such that but one secondary wave is produced in the branch wave guide by an incident primary wave, and the said secondary wave propagates in a backward direction relative to that of the incident primary wave. Such a coupling structure therefore has a high selectivity characteristics.

A reflected wave traveling in main guide 10 in a direction opposite to the incident wave will be coupled to the branch wave guide 11 in a like manner, with the resultant secondary wave traveling backwardly with respect to the reflected wave. The resultant secondary waves produced by the incident and reflected primary waves thus travel in opposite directions away from the aperture, and in backward directions with reference to the corresponding primary waves. The ratio of energy in a secondary wave to the energy in its corresponding primary wave is dependent primarily upon the size of the coupling aperture, and is substantially independent of the phase or relative position of the standing wave. In a wave guide system having an energy source which is substantially unaffected by variations of the standing wave ratio in the wave guide, the magnitude or intensity of the energy excited in the branch wave guide by an incident wave in the main wave guide is substantially independent of the standing wave ratio in the main wave guide.

Generally stated, the dimensions necessary for high selectivity in a directional coupler of the nature here described are such that the product of the associated guide wave lengths is equal to twice the square of the free-space wavelength of the microwave energy involved. The guide wavelengths referred to may be computed by means of formulae given in the article on wave guides in Terman's "Radio Engineer's Handbook." The particular directional coupler here shown and described in detail, utilizes associated wave guides whose wider walls are equal and dimensioned to satisfy the condition recited above. It is to be understood, however, that certain departures from characteristics of the illustrated structure may be made, including the shape of the coupling aperture which may be of suitable non-circular form, and the dimensions of the associated wave guides.

Figure 3:
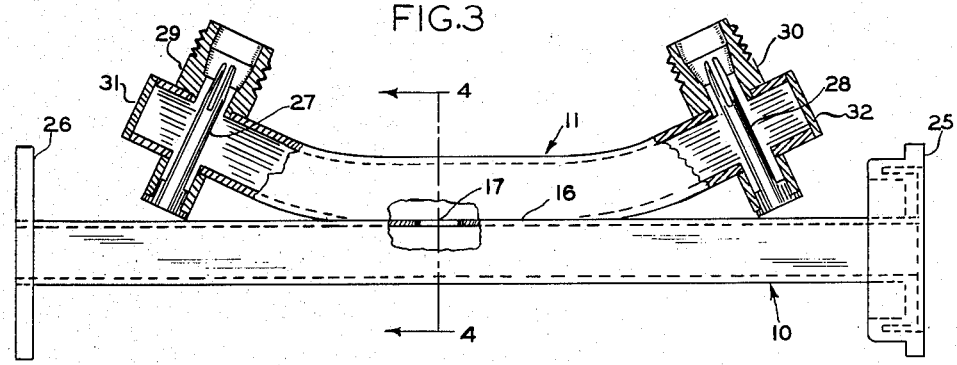
Fig. 3 is a vertical view of a wave guide directional coupler.
Figure 4:
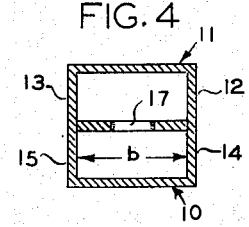
Fig. 4 is a transverse view taken along section line 4—4 of Fig. 3.

The structure shown in Figs. 3 and 4 is a directional coupler embodying the principles discussed in connection with Figs. 1 and 2, and is adapted to be inserted or mounted in series with the transmission line of a microwave system. The branch wave guide 11 may be soldered or otherwise secured with a wider wall flush against a wider wall of the main guide 10, or the complete structure may be formed with a common wall 16 as shown. The main and branch wave guides are parallel and the width $b$ of the common wall is substantially equal to $0.707\lambda$. The common wall 16 between the guides has a suitably sized circular aperture 17 therein to permit coupling a desired proportion of radio frequency power from the main guide to the branch guide.

Main wave guide 10 is fitted with choke-flange joints 25 and 26 as shown which are well-known in the art as a means of joining length of wave guide. Other joining structures may be utilized, however, and may include transition sections for matching the main wave guide 10 to a transmission line of different cross-sectional size or shape.

Each end of the branch wave guide 11 is fitted with transformation means to provide proper coupling between the rectangular branch wave guide and coaxial cables (not shown) for connection to other system components. Such transformation means are well-known to the art, and in the illustrated embodiment comprise stub-supported pick-up elements 27 and 28 extending across the branch wave guide perpendicularly to the wider sides and into short tubular elements 29 and 30 respectively. The tubular elements 29 and 30 are externally threaded, and the upper parts of pick-up elements 27 and 28 are slotted to receive connecting coaxial cables (not shown). The pick-up elements 27 and 28 are suitably spaced from end plates 31 and 32 respectively, of the branch wave guide, to properly match the coaxial lines to the branch wave guide.

A directional coupler such as disclosed in Fig. 3 may be utilized for measurement purposes. The traveling incident and reflected waves, carried by a transmission line including the main wave guide 10 of the directional coupler, excite secondary waves in branch wave guide 11 which are oppositely directed and proportional, respectively, to the incident and reflected waves. Thus, if incident and reflected waves travel from left to right and from right to left, respectively, in the main wave guide 10 shown in Fig. 3, measuring instruments connected through coaxial cables to elements 27, 29 and 28, 30 will indicate values proportional to the magnitudes of the incident and reflected waves, respectively. A suitable measuring instrument which may be here utilized is the thermistor bridge meter, well known in the art. The directional coupler and meters may be calibrated against absolute measurements such as obtainable by means of a continuous-flow calorimeter load structure which may terminate the main wave guide transmission line.

A directional coupler of this character may also be used in connection with only an incident wave, for the operating conditions of a microwave system are usually such that the standing wave ratio is small. In such instances the load power may be determined with good accuracy by measurement of only the incident wave, even if the standing wave ratio varies, and but one of the transformation means need therefore be utilized. The other may be replaced by a non-reflecting absorption means.

The use of a directional coupler is not limited to the measurement of incident and reflected waves for determination of standing wave ratio and load power. Another use of the directional coupler here disclosed may be to couple an echo box to a microwave system for overall performance checking in a manner well known to the art. Still another use may be to couple a signal generator to a microwave system for measurement of receiver sensitivity and alignment of automatic frequency control circuits.

It is apparent that the invention is not limited to the physical construction illustrated in the drawing, but that various changes may be made without departing from the spirit of the invention.

What is claimed is:

1. A directional coupler, including a first length of wave guide wherein oppositely directed incident and reflected wave energy is propagated, a second length of wave guide, said two lengths of wave guide each having a rectangular cross-section and operating in a $TE_{0,1}$ mode during excitation, and means interconnecting said two lengths of wave guide comprising a common wave guide wall having an aperture therein, said common wall being perpendicular to the direction of the electric field existing within the said two lengths of wave guide, said second length of wave guide having two sections extending in opposite directions from said aperture, said common wave guide wall having a width substantially equal to 0.707 times the free-space wavelength of said wave energy, whereby a proportion of said incident wave energy is coupled into one section of said second length of wave guide, said one section extending from said aperture in a backward direction referred to the direction of propagation of said incident wave energy, and whereby a substantially equal proportion of said reflected wave energy is coupled into the other section of said second length of wave guide.

2. A directional coupler, including a first length of rectangular wave guide wherein incident and reflected electromagnetic wave energy is propagated, a second length of rectangular wave guide, the wider wall dimension of said first and second wave guides being 0.707 times the free space wavelength of said propagated wave energy, and means coupling said two lengths of wave guide comprising a section of wider wave guide wall common to said wave guides and having an aperture therein, said section of wider wall being perpendicular to the direction of the electric field existing within the said two lengths of wave guide, said aperture being located at a position of maximum electric field intensity, said second length of wave guide having two sections extending in opposite directions from said aperture, whereby a portion of said incident wave energy is backwardly coupled into one of said second wave guide sections, and a portion of said reflected wave energy is backwardly coupled into the other of said second wave guide sections.

HANS A. BETHE.

REFERENCES CITED

The following references are of record in the file of this patent:

UNITED STATES PATENTS

| Number | Name | Date |
|---|---|---|
| 2,153,728 | Southworth | Apr. 11, 1939 |